Figure 1:
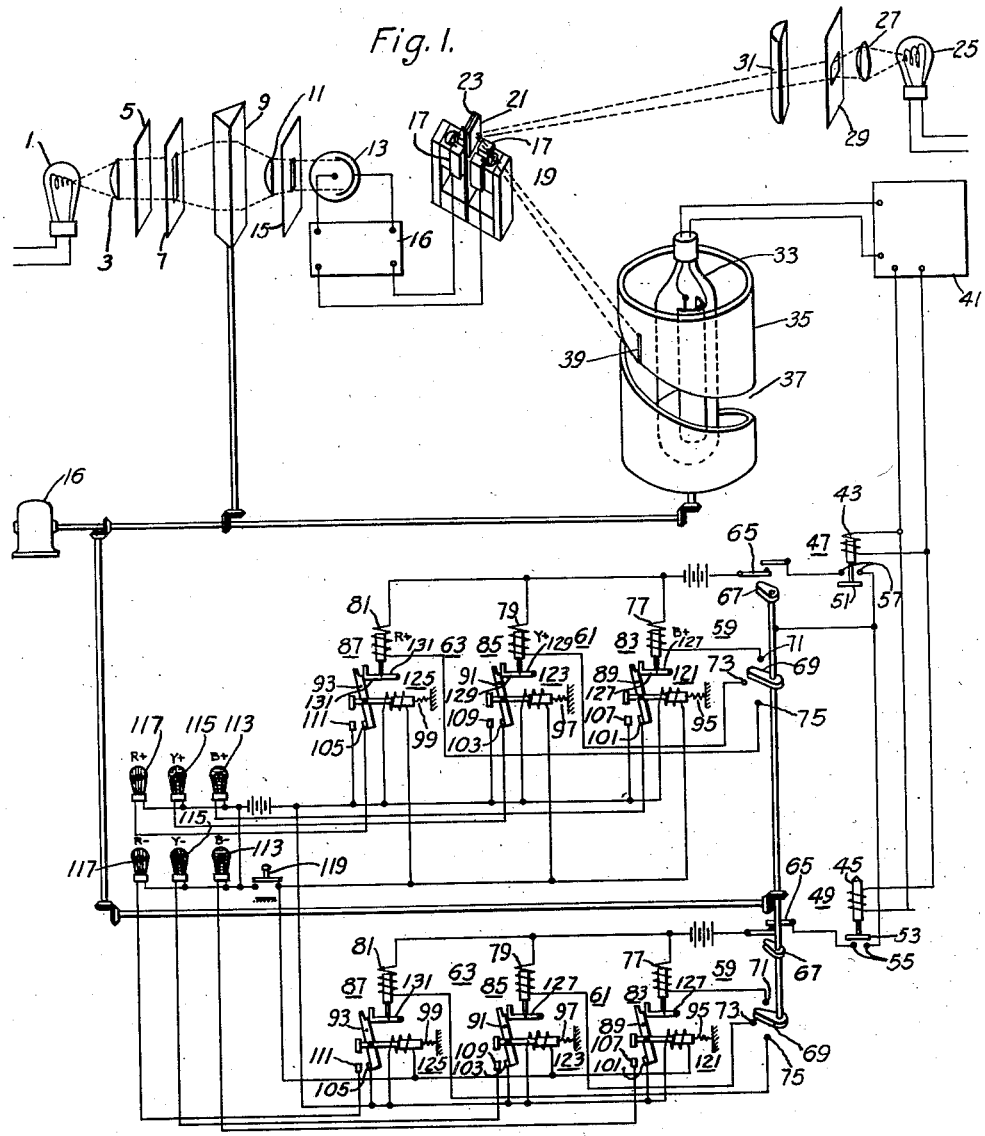

Sept. 12, 1933.   P. E. STOGOFF   1,926,824
SORTING SYSTEM
Filed Nov. 11, 1931

WITNESSES

INVENTOR
Peter E. Stogoff
BY
ATTORNEY

Patented Sept. 12, 1933

1,926,824

UNITED STATES PATENT OFFICE 1,926,824

SORTING SYSTEM

Peter E. Stogoff, Wilkinsburg, Pa., assignor to Westinghouse Electric & Manufacturing Company, a corporation of Pennsylvania Application November 11, 1931
Serial No. 574,346

6 Claims. (Cl. 88—14)

My invention relates to colorimetry and has particular relation to automatic color and shade analyzing apparatus.

It is an object of my invention to provide apparatus for analyzing materials with regard to their constituent colors.

Another object of my invention is to provide apparatus for analyzing articles to be tested with regard to their constituent colors and for recording the deviation of the colors of the articles from the colors of a predetermined standard.

A further object of my invention is to provide apparatus for comparing articles as to their shades with an article of standard shade.

A specific object of my invention is to provide a simple and tractable chromometer.

Another specific object of my invention is to provide a chromometer that shall automatically produce visual indications of the deviations of the constituent colors of a sample to be tested from the constituent colors of a standard.

More concisely stated, it is an object of my invention to provide apparatus for comparing articles to be tested with a standard article, not only with regard to color but also with regard to shade and for observing the variations in shade by observing the variations of the constituent colors of the article to be sorted from the corresponding constituent colors of the standard article.

According to my invention, I provide a chromometer in which the radiations emitted by an article to be tested are dispersed and the dispersed radiations are projected on a photosensitive device. The electrical variations produced by the influence of the dispersed radiations on the photosensitive device are converted into variations in a beam of light which impinges on a second photosensitive device through a mask having characteristics which correspond to the characteristics of a standard with which the sample is being compared.

The coaction between the energy converting device, the mask and the second photosensitive device is such that the latter has a uniform response as long as the conversion device acts in a manner corresponding to its action when the first photosensitive device is subjected to the influence of the standard. However, if a region of radiations emitted by the sample should deviate from the standard, the energy conversion device would deviate from its normal operative condition and the uniformity of the response of the second photosensitive device would be disturbed.

The response of the second photosensitive device is properly amplified and an indicating device is provided that coacts with the amplifier to produce the necessary indications of the variation of the sample from the standard. In the embodiment of my invention which is shown herein, the indicating device simply provides qualitative indications of the deviations of the constituent colors of the sample from the colors of the standard. The indicating device merely indicates what constituent colors deviate from the standard and whether the deviation is positive or negative.

It is apparent that, in connection with my invention, a more quantitative indicating device may be utilized. For example, a recording meter may be connected in the output of the system whereby the variations in the second photosensitive device are amplified and may thus indicate the history of the samples which pass before the dispersion device. It is needless to say, of course, that, where single, independent samples are to be analyzed and where the quantitative results of the analysis are desirable, an ordinary meter may be connected in the output of the amplifier.

Figure 2:
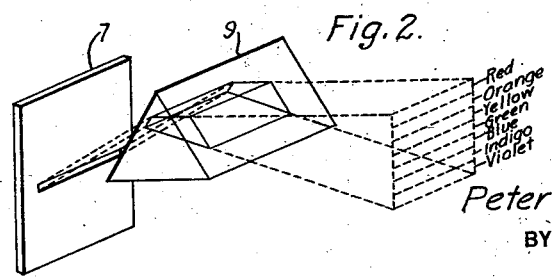

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawing, in which Figure 1 is a diagrammatic view showing the essential elements of a preferred embodiment of my invention, and Fig. 2 is a view in perspective showing the optical influence of the prism on the radiations emitted by the articles to be tested.

The apparatus shown in the drawing comprises a source of radiation 1, the rays from which are collimated by a proper lens system 3 and projected through the sample 5 to be tested. A mask 7 is provided for limiting the rays emitted by the sample and the radiations transmitted through the mask 7 are dispersed by a prism 9 converged by a proper lens system 11 and projected on a photosensitive device 13 through a second mask 15.

While, in the embodiment of my invention shown herein, the radiations are shown as transmitted through the sample 5, it is, of course, possible that, in numerous applications of my invention, the sample will be opaque, in which case, the radiations from the source may be reflected from the sample. The sample 5 may also be a luminous body in which case the lamp 1 would not be necessary.

The prism 9 is geared to a motor 16 of suitable power and is rotated in such manner that the mask 15 between the prism 9 and the photocell 13 successively transmits bands of the spectral colors of the sample 5 which is under test.

The dispersion action of the prism 9 is shown in detail in Fig. 2. It is to be noted that when a homogeneous beam is projected on the prism 9 through the mask 7, the beam is dispersed into the constituent colors thereof. These colors are disposed in a predetermined special relationship to each other and they may be successively projected on the photosensitive element of a photosensitive device such as 13 by rotating the prism 9 before a mask 15 or by moving the mask in proper relationship to the prism.

It is to be noted that, while I have utilized in the preferred practice of my invention a prism as the dispersing device, other dispersing contrivances are well known in the art and may be utilized with more or less advantage depending on the application to which my invention is put. Thus, it is highly conceivable that, instead of a prism, a reflecting or a transmitting grating might be utilized. In such a case, of course, the system must be rendered operative with regard to a predetermined order of the spectrum produced by the grating. Moreover, it is to be noted that the dispersing medium 9 need not be disposed between the sample 5 and the photosensitive device 13, but may be disposed between the source of radiations 1, whereby the sample is illuminated, and the sample 5.

The variations produced by the action of the dispersed radiations on the photosensitive device 13 are amplified by a system 16 and the electrical output of the amplifier 16 is fed into the exciting coil 17 of a galvanometer 19 equipped with a mirror 21 on its moving element 23.

A second source of radiations 25, together with a collimating lens 27, a mask 29 and a cylindrical converging lens 31, are associated with the reflector 21 and produce a beam having an elongated rectangular cross-section which is projected on the reflector 21 and is deflected by the reflector as the latter moves in response to the disturbance produced in the photocell 13.

The beam deflected by the reflector 21 is projected on a photosensitive device 33 through a cylindrical mask 35 which is suitably geared to the motor 16 driving the prism 9 and is rotated about the photosensitive device 33 in synchronism with the prism 9. The mask 35 is equipped with an opening 37 cut in the surface thereof and having a configuration which corresponds to the color pattern of the standard with which the sample 5 is being compared. The opening 37 in the mask 35 is so cut that, if the reflector 21 is responding to a color which is equivalent to a corresponding color of the standard, the rectangular image 39 of the slot 29, which is projected on the mask 35 is bisected by the upper boundary thereof.

If the color pattern of a sample 5 under test is identical to the color pattern of the standard, the illumination which is projected on the second photosensitive device 35 while the sample is under inspection is equivalent to the flux contained in one-half of the rectangle 39 deflected by the reflector 21. If a color component of a sample 5 deviates one way or the other from the corresponding color component of the standard, the beam is deflected in such manner that the second photosensitive device 33 is either more or less energized, its condition in this connection depending on whether the radiations emitted by the sample 5 in the particular color in question are greater or less in intensity than the radiations emitted by the standard in the same color.

In the most general application of my invention, I have found that, for all practical purposes, it may be utilized with advantage with an indicating system which simply gives a qualitative indication of the variations of the sample from the standard in a plurality of distinct colors. I have found, for example, that, for purpose of many applications of my invention may be served sufficiently if qualitative indications of the comparison of the sample and the standard with regard to the colors red, yellow and blue are given.

While I do not wish to be restricted to the indicating device of the type yielding only qualitative results, I shall now proceed to describe an indicating device which I have found useful and which is illustrated herein.

The variations in current produced by the deflected beam on the photosensitive device are suitably reenforced by an amplifier 41 and the output of the amplifier is fed to the exciting coils 43 and 45 of a plurality of relays 47 and 49. One relay 47 is normally deenergized and becomes energized when the reflector 21 increases the light flux impinging on the photocell 33. The other relay 19 is normally energized and becomes deenergized when the reflector 21 decreases the flux impinging on the photocell 33. In either case, the movable contactors 51 or 53 of the relays 47 or 49 engage a plurality of corresponding fixed contacts 55 or 57.

The fixed contacts 55 and 57 are each common to a plurality of circuits 59, 61 and 63 including a switch 65 which is closed for a predetermined period, corresponding to the period over which the prism 9 is active in energizing the first photocell, by a dog 67 which is rotated in synchronism with the prism 9 by the motor 16 that rotates the prism. The two circuits 59, 61 and 63 to which the fixed contacts 55 and 57 are common are similar, as are the switches 65 and dogs 67 associated with the circuits and, consequently, only one set of circuits need be described. It will be understood, however, that one of the sets of circuits is provided for the purpose of indicating the deviations of one polarity of a constituent color of the sample 5 from the corresponding color of the standard and the other set of circuits is provided for the purpose of indicating the deviations of the opposite polarity.

Each of the circuits 59, 61 and 63 containing the fixed contacts 55 and 57 is capable of being closed by a movable contactor 69 which is rotated in synchronism with the prism 9 and which is capable of engaging a plurality of fixed contacts 71, 73 and 75 corresponding to the circuits. When one of the fixed contacts 71, 73 or 75 is engaged by the rotating contactor 69 simultaneously with the engagement of the switch 65 by the rotating dog 67 and of the engagement of the movable contactor 51 or 53 of the relays 47 or 49 with their corresponding fixed contacts 57 or 55, the exciting coil 77, 79 or 81 of a relay 83, 85 or 87 corresponding to the fixed contacts 71, 73 or 75 which is engaged by the rotating contactor 69 is energized. Each relay 83, 85, and 87 is latched in its closed position by a lever 89, 91 or 93 which is movable under the action of a spring 95, 97 or 99 and is equipped at its lower end with a movable contact 101, 103 or 105 which engages a corresponding fixed contact 107, 109, or 111 to close a circuit through a lamp 113, 115 or 117 that thus becomes energized to indicate that the sample deviates in a particular color from the standard.

It is to be noted that, since the movable contactor 69 is rotated in synchronism with the prism 9, its engagement with the corresponding fixed contacts 71, 73 and 75 corresponds to predetermined colors projected by the prism onto the first photocell 13 and to a corresponding relation between the mask 35 rotating before the second photocell 33 and the deviation of the beam deflected by the reflector 21 associated with the first photocell 13. Thus if it should happen that the sample 5 emits the color red to a greater intensity than the standard, the rotating switch 69 that engages the fixed contacts 75 at an instant when the color red is reflected from the sample 5 is influencing the cell 131 would close the circuit 63 corresponding to this color, since by reason of the fact that the color red is emitted by the test article 5 to a greater intensity than by the standard, the relay 47 is energized and the dog 67 provided for the purpose of closing the circuits 59, 61 and 63 when the prism 9 is active is also active. The relay 87 corresponding to the color red is, therefore, energized and latched in its energized condition, permitting, at the same time, the latch 93 to close a circuit through the lamp 117 indicating that the color of the sample deviates positively from the color of the standard in the color red.

It will be seen from the above discussion that as the prism 9 rotates, the lamps 113, 115 or 117 corresponding to the color pattern of the sample, are energized and their circuits are locked-in in the energized conditions. The operator may observe what lamps are illuminated and thus obtain an indication as to the condition of the sample with regard to its constituent colors, or better, with regard to both its color and shade.

After making the observations, the operator may press a push button 119 to close circuits to energize relays 121, 123 and 125 associated with the latching levers 89, 91 and 93. The latching levers 89, 91 and 93, which are active in holding the relays 83, 85 and 87 in the latched condition are then disengaged from the latching elements 127, 129 and 131 of the relays, the latching elements of the relays are permitted to fall under gravity to their inactive position and the system is reverted to its original unenergized condition and is prepared for a new sample.

It is to be noted that the system which is described herein is applicable principally for the analysis of independent, individual samples. Be it understood, however, that my invention may be applied with facility to the analysis of a connected series of samples which may, for example, be projected into the illuminating beam by a suitable conveyor and may be sorted, in a number of groups corresponding to the condition of their constituent colors. However, the samples need not necessarily be sorted but may be passed before the illuminating beam in a predetermined succession, while the indicating device is replaced by a recording meter whereon a time curve, corresponding to the samples, is automatically drawn.

It is further to be noted that, while I have shown a galvanometer 19 equipped with a reflector 21 for producing the necessary response to the condition of the first photocell 13 such a device is not essential and may be replaced by a glow lamp, or by a Kerr cell system. In such a case, the mask 35 associated with the second photocell 33 would be of translucent or transparent material so constructed as to modify the beam emitted by the light valve in such manner that the response of the second cell 33 is uniform for a color pattern corresponding to the standard.

Finally, it may be said that, while photocells do not, in general, have a uniform response for different colors and that, in consequence of the variable response of the photocells, the configuration of the opening 37 in the mask 35 associated with the second photocell 33 would be rather complicated, it is a well known fact that, by suitably masking a photocell, a substantially uniform response may be produced. While such a cell is not an absolute necessity in the practice of my invention, it is contemplated by my invention and may be utilized, if the necessity therefor arises.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. In a chromometer, means for dispersing the radiations emitted by an article to be analyzed, energy translating means, said energy translating means including radiation responsive means, means for successively projecting the radiations emitted by said dispersing means with a predetermined periodicity on said radiation-responsive means to produce predetermined variations in said energy translating means, said means being recurrently active and inactive for predetermined intervals of time, means, responsive to said energy translating means for indicating deviation of said radiations emitted by said dispersing means from a predetermined color pattern and means for rendering said indicating-responsive means inactive to indicate its response during said intervals of inactivity of said projecting means.

2. In a spectrophotometer, means for dispersing the radiations emitted by an article to be tested, photosensitive means to respond to said rays emitted by said dispersing means, means for producing a beam of radiations having a predetermined cross-section, means for deflecting said beam of radiations, said means being responsive to said photosensitive means, additional photosensitive means to respond to said deflected beam and means for masking said deflected beam to produce a uniform response in said last-named photosensitive means when the deflection of said deflecting means is a predetermined function of time.

3. In a spectrophotometer, means for dispersing the radiations emitted by an article to be tested, photosensitive means to respond to said rays emitted by said dispersing means, means for producing a beam of radiations having a predetermined cross-section, means for deflecting said beam of radiations, said means being responsive to said photosensitive means, additional photosensitive means to respond to said deflected beam, means for masking said deflected beam to produce a uniform response in said last-named photosensitive means when the deflection of said deflecting means is a predetermined function of time, and means, responsive to said last-named photo-sensitive means for indicating deviation of deflection of said deflecting means from said function.

4. In a colorimeter, means for dispersing the radiations emitted by an article to be tested, photosensitive means to respond to the radiations emitted by said dispersing means, means for producing another beam of radiations, means, to cooperate with said photosensitive means, to vary the condition of said last-named beam of radiations in accordance with the influence of the radiations emitted by said dispersing means on said photo-sensitive means and means to respond to the condition of said last-named beam of radiation after it has been influenced by said varying means for indicating variations in said last-named beam that deviate from the variations that would be introduced by a test sample of predetermined color.

5. In a colorimeter, means for dispersing the radiations emitted by an article to be tested, photo-sensitive means to respond to the radiations emitted by said dispersing means, means for producing another beam of radiations, means to be actuated in accordance with the response of said photo-sensitive means to the radiations emitted by said dispersing means for deflecting said last-named beam to a degree dependent on the response of said photo-sensitive means and means to respond to the beam of radiations so deflected for indicating deflections that correspond to deviations of the radiations emitted by said article from a predetermined color.

6. In a colorimeter, means for dispersing the radiations emitted by an article to be tested, photo-sensitive means to respond to the radiations emitted by said dispersing means, means for producing another beam of radiations, means for producing a physical disturbance to be propogated in the region ambient to said photo-sensitive means, means, to cooperate with said photo-sensitive means, to vary the condition of said physical disturbance in accordance with the influence of the radiations emitted by said dispersing means on said photo-sensitive means, means to respond to said disturbance after it has been influenced by said varying means, means for indicating the response of said responsive means and means for so limiting the influence of said disturbance on said last-named responsive means that said indicating means is actuated only when the color of said article varies from a predetermined color pattern.

PETER E. STOGOFF.